United States Patent [19]
Mori et al.

[11] Patent Number: 5,703,709
[45] Date of Patent: Dec. 30, 1997

[54] METHOD AND DEVICE FOR COLOR LASER MARKING

[75] Inventors: Akira Mori, Chigasaki; Shigeki Hagiwara; Hirokazu Tanaka, both of Hiratsuka, all of Japan

[73] Assignee: Komatsu Ltd., Tokyo, Japan

[21] Appl. No.: 652,518

[22] PCT Filed: Dec. 7, 1994

[86] PCT No.: PCT/JP94/02054

§ 371 Date: Jun. 10, 1996

§ 102(e) Date: Jun. 10, 1996

[87] PCT Pub. No.: WO95/15833

PCT Pub. Date: Jun. 15, 1995

[30] Foreign Application Priority Data

Dec. 10, 1993 [JP] Japan ................................ 5-341715

[51] Int. Cl.[6] ............................................ G02B 26/08
[52] U.S. Cl. .................. 359/196; 359/204; 359/216; 359/900; 347/232; 347/256
[58] Field of Search ............................ 359/196, 201, 359/202, 204, 209–212, 217–218, 900; 347/134, 232, 241, 243, 244, 256, 258–262, 264

[56] References Cited

U.S. PATENT DOCUMENTS

| | | | |
|---|---|---|---|
| 5,309,273 | 5/1994 | Mori et al. | 359/202 |
| 5,574,492 | 11/1996 | Suzuki | 347/256 |

FOREIGN PATENT DOCUMENTS

| | | |
|---|---|---|
| A2327508 | 8/1989 | European Pat. Off. |
| 56-144995 | 11/1981 | Japan. |
| 2-4584 | 1/1990 | Japan. |
| 4-267191 | 9/1992 | Japan. |
| 5-42379 | 2/1993 | Japan. |

*Primary Examiner*—James Phan
*Attorney, Agent, or Firm*—Sidley & Austin

[57] ABSTRACT

The present invention provides a method and a device for color laser marking for attaining visible coloring without drastic modification of conventional devices and without using dyestuffs. To this end, in a color laser marking method, a workpiece (10) is a synthetic material made from organic and inorganic materials and, when irradiating laser light, patterns in different colors can be obtained by varying the received light intensity on the workpiece (10). In addition, in a color laser marking device, when the workpiece (10) is a synthetic material made from organic and inorganic materials, a controller (11) outputs laser irradiation intensity varying signals to at least one of laser irradiation intensity varying means, such as a laser oscillator (1).

8 Claims, 2 Drawing Sheets

FIG. 2

| LASER POWER | QSW FREQUENCY | LC TRANS-MITTANCE | POLYGON ROTATION SPEED | SCANNING LINE NUMBER | LENS MAGNIFI-CATION | BEAM MODE | GENERATED COLOR |
|---|---|---|---|---|---|---|---|
| 120W | 10 kHz | 40 % | 700 rpm OR LESS | 10 OR MORE | 1/25 | SINGLE | WHITE |
| 120W | 40 kHz | 50 % | 550 rpm OR LESS | 12 OR MORE | 1/25 | SINGLE | YELLOW |
| 120W | 10 kHz | 40 % | 850 rpm OR LESS | 6 OR MORE (×2) | 1/37.5 | TWIN | WHITE |
| 120W | 30 kHz | 50 % | 650 rpm OR LESS | 7 OR MORE (×2) | 1/37.5 | TWIN | YELLOW |

METHOD AND DEVICE FOR COLOR LASER MARKING

TECHNICAL FIELD

The present invention relates to a method and a device for color laser marking, in particular, a method and a device for color laser marking which are suitable for marking patterns in different colors on the surface of the workpiece.

BACKGROUND ART

An example of the conventional technologies in this field is a method for marking on the surface of synthetic materials, as disclosed in Japanese Patent Laid-Open No. 56-144995. This technology includes coloring white, blue, violet, red, etc., the surface of synthetic materials which either contain dyestuffs and silicon-containing inorganic compounds or contain silicon-containing dyestuffs, by exposing the surface with a laser beam having an intensity of at least 1,000 kw/cm$^2$, measured on the surface.

Although the above conventional technology enables coloring white, blue, violet, red, etc., visible coloring may still be useful even though the colors are not as distinct. Further, coloring for marking on the surface of the workpiece, without the drastic modifications of conventional laser marking devices and without using dyestuffs employed in the above conventional technology, may be useful.

SUMMARY OF THE INVENTION

The present invention provides a method and a device for color laser marking, which are suitable for marking patterns in different colors on the surface of the workpiece, considering such a conventional technology and desires.

The method for color laser marking of the present invention is characterized in that the workpiece is a synthetic material made from organic and inorganic materials, and patterns in different colors can be obtained by varying the received light intensity on the workpiece when irradiating the laser light. Further, when this construction is restricted to generated colors, the different colors are visually light grey, white, yellow, and yellowish brown.

According to such a construction, when the workpiece is a synthetic material made from organic and inorganic compounds, the patterns are colored so that the patterns can be recognized to be light grey, white, yellow, and yellowish brown. However, the coloring itself has not been theoretically clarified. Moreover, the received light intensity for promoting the coloring has to be determined in view of the entire marking device construction, because the received light intensity depends on the synthetic materials of the workpiece and the specifications of the laser marking device.

An example of the color laser marking device of the present invention is a device which uses the above method for color laser marking. A first color laser marking device is characterized in that when the workpiece is a synthetic material made from organic and inorganic materials, a controller outputs laser irradiation intensity varying signals to at least one of laser irradiation intensity varying means comprising a laser oscillator, a Q switch of the laser oscillator, a mask, and a drive motor of a raster scan deflector. A typical example of the mask is a transmission type liquid crystal mask.

The means for varying the received light intensity having the above construction comprises a controller for emitting commands to vary the received light intensity, and a laser irradiation intensity varying means which is connected with the controller and is controlled based on the commands. Thus, in this construction, patterns on the surface of the workpiece are automatically colored by appropriately driving the laser irradiation intensity varying means with the controller.

A second color laser marking device of the present invention is characterized in that the workpiece is a synthetic material made from organic and inorganic materials; an optical system comprises at least one of a lens, prism, and mirror for deflection, collection, magnification, division, light attenuation, or mode change; and the optical system comprises a structure so that at least one of the lens, prism, and mirror is exchangeable with various optional parts which power-separate or reflectively scatter the laser light so as to generate patterns in different colors.

The received light intensity varying means having the above construction comprises a changeable optical optional part. Thus, in this construction, patterns on the surface of the workpiece are colored by appropriately exchanging the optical optional part.

BRIEF DESCRIPTION OF DRAWINGS

FIG. 2 is a table illustrating test results of devices and methods according to this embodiment.

BEST MODE FOR CARRYING OUT THE INVENTION

Figure 1:
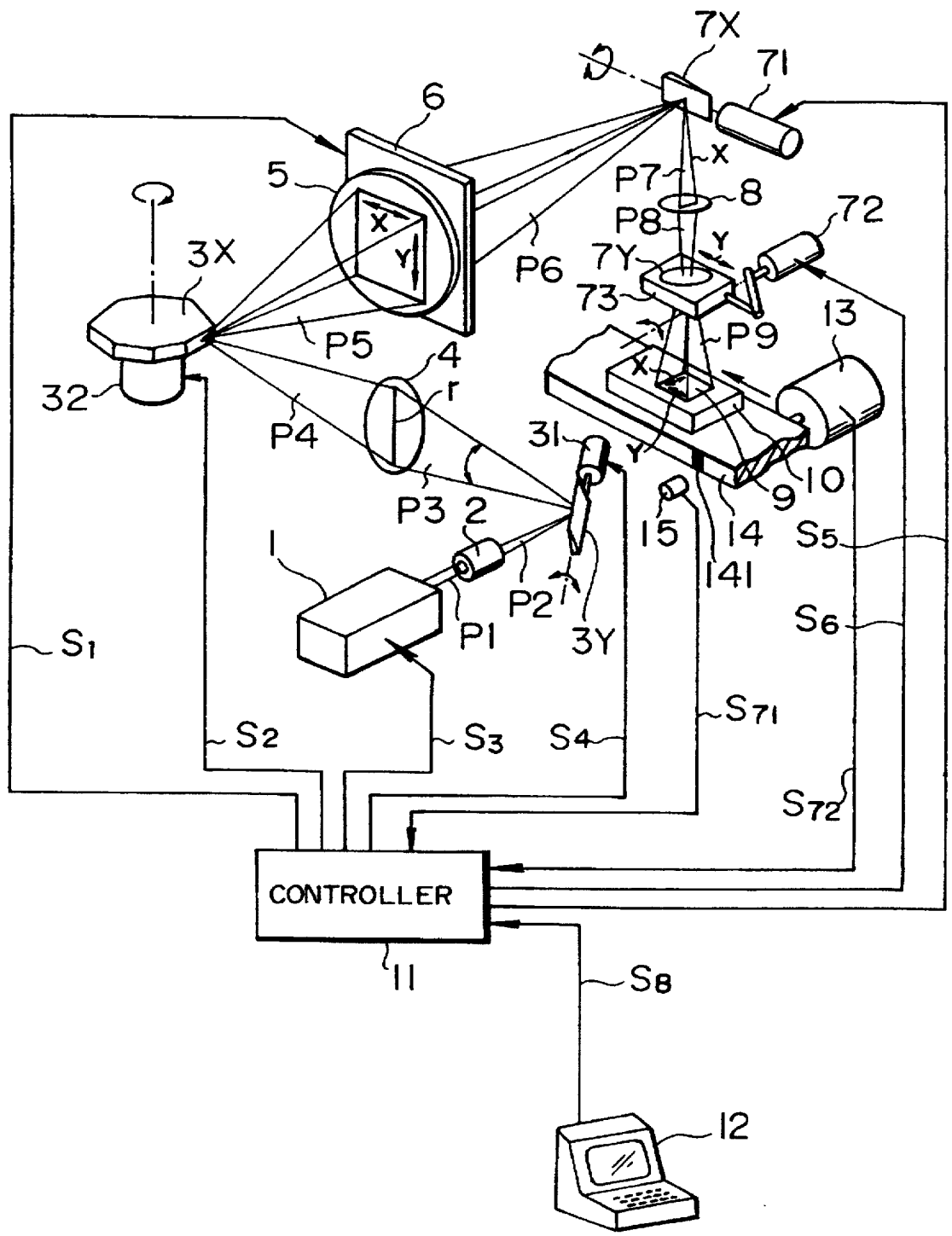
FIG. 1 is an overall schematic diagram of a color laser marking device according to an embodiment of the present invention.

The preferred embodiments of the present invention will now be explained in detail in terms of the method and the device for color laser marking according to the attached drawings.

As shown in FIG. 1, this example is a raster scan type laser marking device. This device has a YAG laser oscillator 1 with a Q switch (hereinafter laser oscillator 1), collecting lenses 2, 4, and 5, a raster scan deflector 3, a transmission type liquid crystal mask 6, a deflector 7 for irradiating the optimum workpiece region, an objective lens 8, a workpiece 10, a controller 11, an external terminal 12, a workpiece-feeder 14 driven by a motor 13, a location sensor 15, and the like. An example of the workpiece 10 in each embodiment is an epoxy resin, Low-Strain Epoxy Resin T-300, made by Toshiba Chemical Co. and containing inorganic compounds, such as silicon dioxide and antimony trioxide, according to X-ray analysis.

This device will be described in detail. The raster scan deflector 3 has a scan mirror 3Y and a polygon mirror 3X, and the scan mirror 3Y is rotated by a motor 31 to deflect the laser light P2 in the Y direction on a transmission type liquid crystal mask 6. On the other hand, the polygon mirror 3X, rotated at a constant speed by a motor 32, deflects the laser light P4 in the X direction on the transmission type liquid crystal mask 6. The deflector 7, for irradiating the optimum workpiece region, has a scan mirror 7X and a moving table 7Y. The scan mirror 7X, incrementally rotated at small angles by a motor 71, deflects the transmitted light P6 in the X direction on a marking area 9 of the workpiece 10 to maintain the irradiation on the optimum workpiece region. On the other hand, the moving table 7Y, moved by a motor 72, deflects the transmitted light P8 in the Y direction on the marking area 9 of the workpiece 10 to maintain the irradiation on the optimum workpiece region.

The controller 11 is electrically connected to the transmission liquid crystal mask 6 through a line S1, to the motor 32 through a line S2, to the laser oscillator 1 through a line S3, to the motor 31 through a line S4, to the motor 71 through a line S5, to the motor 72 through a line S6, to the location sensor 15 through a line S71, to the motor 13 through a line S72, and to the external terminal 12 through a line S8.

Further, the controller 11 synchronously drives or controls the on-off control action of the laser generation and the intensity of the output light of the laser oscillator 1, the raster scan speed of the raster scan deflector 3, the deflection movement of the deflector 7 for irradiating the optimum workpiece region, the movement and stopping of the workpiece feeder 14, and the displaying and rewriting of the image with the transmission liquid crystal mask 6, as well as the communication with the external terminal 12.

The operation of such construction will be explained. The laser light P1 from the laser oscillator 1 is collected by the collecting lens 2 and irradiated onto the raster scan deflector 3, and is then subjected to raster irradiation through the collecting lens 5 onto the displaying image face of the transmission type liquid crystal mask 6. The collecting lens 5 collects the transmitted light P6, containing image information from the transmission type liquid crystal mask 6, onto the deflector 7 for irradiating the optimum workpiece region. The laser light P9 from the deflector 7, for irradiating the optimum workpiece region, is irradiated within the marking area 9 on the workpiece 10 to mark patterns of the above image on the surface of the workpiece 10. After accomplishment of marking, the next workpiece 10 is transferred to the marking position by driving the workpiece feeder 14. Additionally explaining, this laser marking device previously divides the whole pattern into individual pattern segments, each of which is sequentially displayed on the transmission type liquid crystal mask 6. The deflector 7 for irradiating the optimum workpiece region deflects the laser light P9 from each pattern segment so that the pattern segments form the entire image.

In the main body of such a laser marking device, the laser oscillator 1 is Q-switching-controlled by the controller 11, enabling on-off control of the laser generation as well as the modification of the intensity and the oscillating interval of the laser light. The controller 11 also controls the application of voltage to the transmission type liquid crystal 6, thus enabling the modification of its transmittance. Further, the scanning speed of the raster scan deflector 3 is controlled by the controller 11. Accordingly, each of these units can change the intensity of the received light on the surface of the workpiece 10, based on the commands from the controller 11. In other words, the received light intensity on the surface of the workpiece 10 can be controlled by the controller and these units. And such control can be carried out by only modifying the program of the conventional devices 11.

By the way, such modification of the received light intensity on the surface of the workpiece 10 can be carried out either automatically with the above controller 11 and the laser irradiation intensity varying means, or manually, etc. That is, in the above laser marking device, collector lenses 2, 4, and 5 and objective lens 8, having various reflective scattering ratios, can be prepared as optional parts, and the received light intensity can be modified by appropriately exchanging such parts.

Concerning the laser marking device, since various laser marking devices having similar specifications are used, the above controller and the laser irradiation intensity varying means such as lens should, of course, not be limitedly viewed. When using a controller, the laser oscillator is, for example, not limited to the above YAG laser oscillator with a Q switch; YAG laser oscillators by CW oscillation can be also used. Further, at the present stage, other laser oscillators would have some disadvantages for use as the laser marking device in efficient, operational and economical points of view. On the other hand, in the manual operation, there are laser marking devices, for example, merely having various lenses, prisms, and mirrors for deflection, magnification, division, mode modification, and the like. In the present invention, such devices can also be used, not only by reflective scattering but also by magnification, division, mode modification, or the like in order to modify the received light intensity on the surface of the workpiece. Therefore, regardless of automatic or manual operation, and even by the combined use thereof, the color laser marking device can be used to adequately change the received light intensity on the surface of the workpiece.

Moreover, in the main body of the above conventional laser marking device, an optical attenuator can be positively and optionally provided between the laser source and the laser workpiece. In such a way, the color on the workpiece can be changed by controlling the laser light intensity irradiated onto the workpiece. Examples of the light attenuator include frosted glasses, the combination of a polarizer and an analyzer, Pockels cell, and the like. When using the combination of a polarizer and an analyzer, the laser light intensity can be varied by modifying the opposite angle between both elements. Further, when using the Pockels cell, an external electric control is available for the laser light intensity.

FIG. 2, showing experimental results of the present invention, displays patterns of colors on the surface of the workpiece which are generated by combinations of some means such as parameters varying received light intensity, regardless of whether automatic or merely exchanging including manual change. In detail, parameters which represent laser irradiation intensity varying means modified and controlled by the controller, include the laser output, the Q switch frequency, the scanning line number, the transmittance of the transmission type liquid crystal mask, and the rotation speed of the polygon mirror. On the other hand, parameters for varying received light intensity, which is manually controlled, including the lens magnification and the beam mode are described.

In each aforementioned parameter, the received light intensity on the surface of the workpiece increases when the la-ser output increases, when the Q switch frequency increases, when the transmittance increases, when the rotation speed of the polygon mirror decreases, when the scanning line number increases, when the lens magnification decreases (the denominator increases in the table), or when the beam mode is single. In addition the value of each parameter is determined as follows: The laser output is determined by the current to the excitation lamp as controlled by the controller, the scanning line number is determined by the rotation speed of the scan mirror as controlled by the controller, and the lens magnification is determined by exchanging the objective lens with another one having a different magnification, respectively. Further, as the beam mode, a single, original circular beam can be converted into a twinned, vertical peanut-like shape by inserting the polarizing prism in the optical path. As a result, visual white and yellow colors are generated. In detail, the generated color visually changes to yellowish brown, yellow, white, or light grey in turn with the increased receiving intensity.

By the way, it is practically significantly convenient if the above received light intensity can be represented by, for example, the laser irradiation density per unit time and unit area on the surface of the workpiece. However, in the YAG laser oscillator with a Q switch, the increased pulse interval causes an extremely high peak value, whereas the decreased peak value causes a narrowed pulse interval, both resulting in difficult observation. Further, as shown in the parameters of FIG. 2, due to different specifications of laser marking devices and different threshold values on the generated colors based on different materials for the workpieces, it is difficult to evenly determine the laser irradiation density specifying the generated color for all the workpieces.

Therefore, practically, when the specifications of the main body of the laser marking device and the material of the workpiece are determined, for example, the Q switch pulse density and the Q switch frequency per unit time and unit area on the surface of the workpiece, the receiving intensity can be correlated with the generated colors. This is practical, since the Q switch pulse density and the Q switch frequency can be experimentally and empirically determined.

In the aforementioned embodiments, when the workpiece is a synthetic material made from organic and inorganic compounds, patterns in different colors can be obtained by varying the received light intensity at the laser light receiving portion of the surface of the workpiece. Moreover, coloring can be surely visible without drastic modification of conventional laser marking devices, and without using dyestuffs as in conventional technologies. Additional effects include; the same workpiece can be marked with plural colors and different gradations; color chance is available when the workpiece is exchanged; and soot hardly forms.

INDUSTRIAL APPLICABILITY

The present invention is useful as a method and a device for color laser marking, which can color so as to be surely visible, without drastic modifications of conventional laser marking methods and devices, and without using dyestuffs.

What is claimed is:

1. A method of laser marking a surface of a workpiece with a plurality of colors, said method comprising:

displaying a pattern on a mask which selectively passes a laser beam incident thereto;

generating a laser beam;

directing the thus generated laser beam through said mask and an optical system onto a surface of said workpiece so as to produce a pattern of a first color on said surface of said workpiece, said surface of said workpiece being made of a synthetic material containing organic and inorganic materials;

said optical system comprising at least one element for deflection, collection, magnification, division, attenuation, or mode change of said laser beam;

changing at least one of said at least one element for deflection, collection, magnification, division, attenuation, or mode change of said laser beam with another element for deflection, collection, magnification, division, attenuation, or mode change of said laser beam to thereby modify said optical system;

directing said thus generated laser beam through said mask and the thus modified optical system onto said surface of said workpiece, having said pattern of said first color thereon, to produce a pattern of a second color on said surface of said workpiece, said second color being different from said first color, thereby providing a marked pattern on said surface of said workpiece wherein said marked pattern has a plurality of colors.

2. A method in accordance with claim 1, wherein said step of changing comprises removing at least one of said at least one element, and substituting, for the thus removed at least one element, at least one new element for deflection, collection, magnification, division, attenuation, or mode change of said laser beam, to thereby modify said optical system.

3. A method in accordance with claim 2, wherein the thus substituted at least one element comprises at least one element which power-separates or reflectively scatters the thus directed laser beam so as to generate a pattern on said surface of said workpiece in a color which is different from said first color.

4. A method in accordance with claim 1, wherein said at least one element is at least one of a lens, a prism, and a mirror.

5. A method in accordance with claim 4, wherein said step of changing comprises removing at least one of said lens, said prism, and said mirror and substituting for each thus removed lens, prism, or mirror a new lens, prism, or mirror to thereby modify said optical system so as to generate a pattern on said surface of said workpiece in a color which is different from said first color.

6. A method in accordance with claim 1, wherein each step of directing the thus generated laser beam comprises raster-scanning the thus generated laser beam onto said mask having the thus displayed pattern so as to selectively pass the thus raster-scanned laser beam through said mask.

7. A method in accordance with claim 1, wherein said first color is a first one of visually light grey, white, yellow, and yellowish brown, and wherein said second color is a different one of visually light grey, white, yellow, and yellowish brown.

8. A method in accordance with claim 1, wherein said mask is a transmission type liquid crystal mask.

* * * * *